(12) United States Patent
Morita et al.

(10) Patent No.: US 12,307,231 B2
(45) Date of Patent: May 20, 2025

(54) INFORMATION PROCESSING DEVICE, PROGRAM UPDATE SYSTEM, AND PROGRAM UPDATE METHOD

(71) Applicant: Hitachi Astemo, Ltd., Hitachinaka (JP)

(72) Inventors: Nobuyoshi Morita, Tokyo (JP); Masashi Yano, Tokyo (JP); Mikio Kataoka, Tokyo (JP); Shuhei Kaneko, Tokyo (JP); Teruaki Nomura, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/800,690

(22) PCT Filed: Jan. 29, 2021

(86) PCT No.: PCT/JP2021/003367
§ 371 (c)(1),
(2) Date: Aug. 18, 2022

(87) PCT Pub. No.: WO2021/166603
PCT Pub. Date: Aug. 26, 2021

(65) Prior Publication Data
US 2023/0070879 A1 Mar. 9, 2023

(30) Foreign Application Priority Data
Feb. 21, 2020 (JP) .................. 2020-028467

(51) Int. Cl.
*G06F 9/44* (2018.01)
*G06F 8/65* (2018.01)
*B60R 16/023* (2006.01)

(52) U.S. Cl.
CPC ............ *G06F 8/65* (2013.01); *B60R 16/0231* (2013.01)

(58) Field of Classification Search
None
See application file for complete search history.

(56) References Cited

U.S. PATENT DOCUMENTS

| 10,642,605 | B2 * | 5/2020 | Miyazaki | ............... G06F 8/658 |
| 2018/0300059 | A1 * | 10/2018 | Nakamura | ............... G06F 8/66 |

(Continued)

FOREIGN PATENT DOCUMENTS

| EP | 3 575 954 A1 | 12/2019 |
| JP | 5-195859 A | 8/1993 |

(Continued)

OTHER PUBLICATIONS

JP-2001043087-A Eng texts, 2001 (Year: 2001).*

(Continued)

*Primary Examiner* — Insun Kang
(74) *Attorney, Agent, or Firm* — Crowell & Moring LLP

(57) ABSTRACT

An information processing device that executes a program includes: a storage unit that includes a plurality of regions for storing a rewritable program; a calculation unit that executes a program stored in the storage unit; a start region specification unit that specifies, from the plurality of regions, a start region in which the calculation unit is executing a program; a rule update unit that specifies a rewrite target region in which a program can be rewritten based on information on the specified start region; and a reception selection unit that selectively receives a rewrite program stored in the rewrite target region.

7 Claims, 6 Drawing Sheets

(56) References Cited

U.S. PATENT DOCUMENTS

| | | | | |
|---|---|---|---|---|
| 2019/0163380 A1* | 5/2019 | Shimizu | ............... | G06F 3/0643 |
| 2019/0258476 A1* | 8/2019 | Miyazaki | ................ | G06F 8/658 |
| 2019/0265967 A1* | 8/2019 | Nakahara | ................ | G06F 8/65 |
| 2021/0155173 A1 | 5/2021 | Harata et al. | | |
| 2021/0240468 A1* | 8/2021 | Shanmugam | ........... | G06F 8/658 |

FOREIGN PATENT DOCUMENTS

| | | | | |
|---|---|---|---|---|
| JP | 10-63497 A | 3/1998 | | |
| JP | 2001-43087 A | 2/2001 | | |
| JP | 2004-355310 A | 12/2004 | | |
| JP | 2005-1218 A | 1/2005 | | |
| JP | 2020-027667 A | 2/2020 | | |
| WO | WO 03/010658 A2 | 2/2003 | | |
| WO | WO-2020032120 A1 * | 2/2020 | ............ | B60W 50/00 |

OTHER PUBLICATIONS

Extended European Search Report issued in European Application No. 21756677.7 dated Jan. 17, 2024 (10 pages).

International Search Report (PCT/ISA/210) issued in PCT Application No. PCT/JP2021/003367 dated Apr. 20, 2021 with English translation (five (5) pages).

Japanese-language Written Opinion (PCT/ISA/237) issued in PCT Application No. PCT/JP2021/003367 dated Apr. 20, 2021 (four (4) pages).

Japanese-language Office Action issued in Japanese Application No. 2024-047480 dated Jan. 28, 2025, with English translation (8 pages).

\* cited by examiner

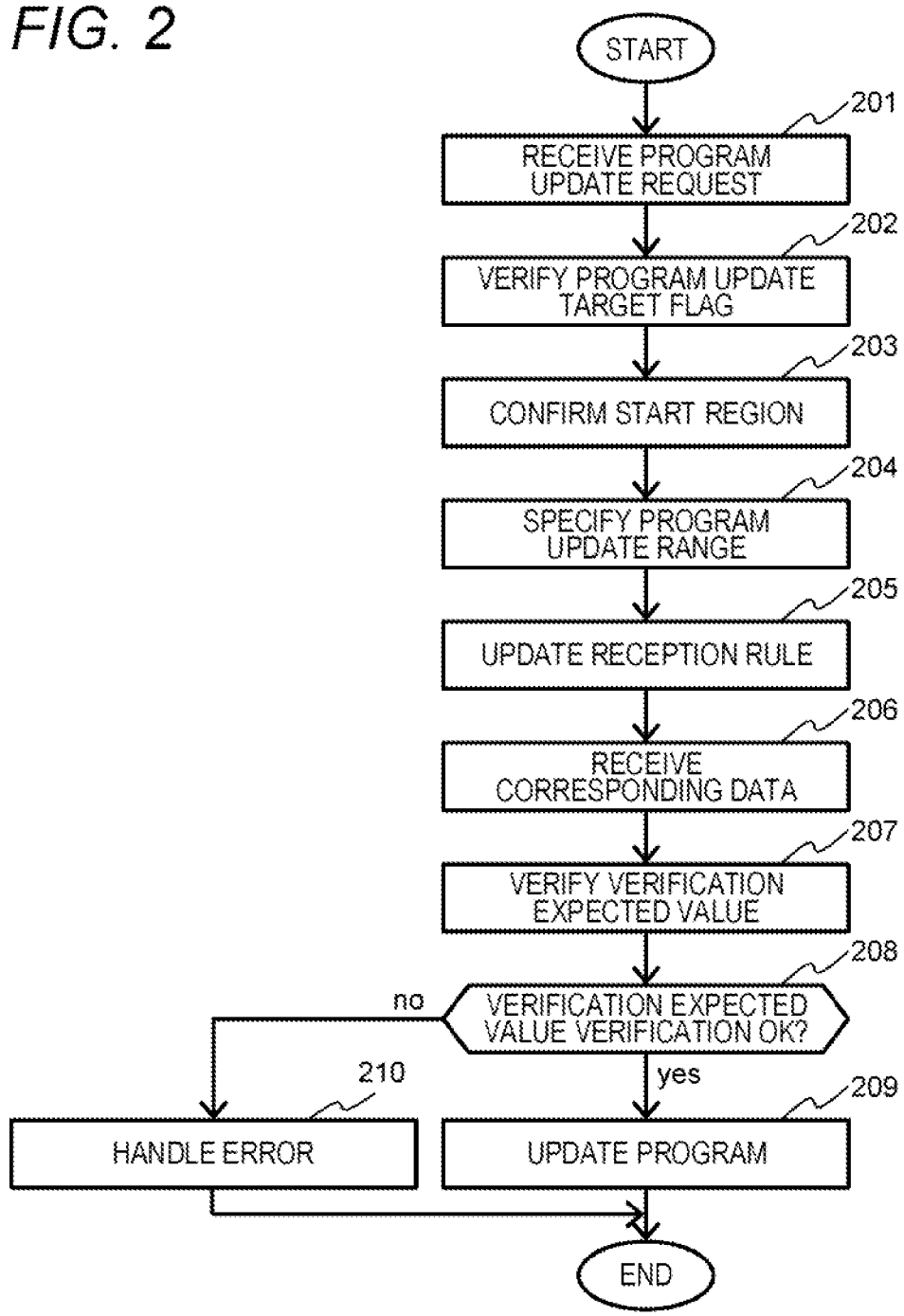

FIG. 4

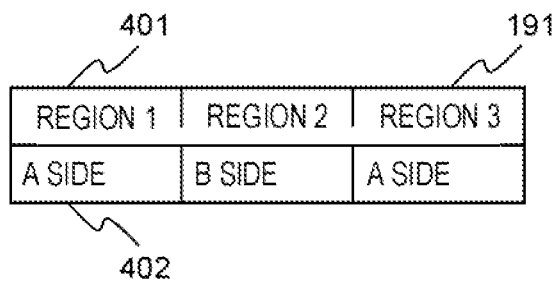

FIG. 5

| TARGET REGION | DATA SIZE |
|---|---|
| PROGRAM UPDATE TARGET FLAG | 4 Byte |
| REGION 1/A SIDE | 1024 Kbyte |
| REGION 1/B SIDE | 1024 Kbyte |
| REGION 2/A SIDE | 256 Kbyte |
| REGION 2/B SIDE | 256 Kbyte |
| REGION 3/A SIDE | 1024 Kbyte |
| REGION 3/B SIDE | 1024 Kbyte |
| ... | ... |
| VERIFICATION EXPECTED VALUE (REGION 1/A SIDE) | 384 Byte |
| VERIFICATION EXPECTED VALUE (REGION 1/B SIDE) | 384 Byte |
| VERIFICATION EXPECTED VALUE (REGION 2/A SIDE) | 384 Byte |
| VERIFICATION EXPECTED VALUE (REGION 2/B SIDE) | 384 Byte |
| VERIFICATION EXPECTED VALUE (REGION 3/A SIDE) | 384 Byte |
| VERIFICATION EXPECTED VALUE (REGION 3/B SIDE) | 384 Byte |
| ... | ... |

FIG. 6

| REGION 1/ A SIDE | REGION 1/ B SIDE | REGION 2/ A SIDE | REGION 2/ B SIDE | REGION 3/ A SIDE | REGION 3/ B SIDE | ... | VERIFICATION EXPECTED VALUE (REGION 1/B SIDE) | ... |
|---|---|---|---|---|---|---|---|---|
| 0 | 1 | 0 | 0 | 0 | 1 | ... | 1 | ... |

FIG. 7

| TARGET REGION | DATA SIZE |
|---|---|
| PROGRAM UPDATE TARGET FLAG | 4 Byte |
| REGION 1/A SIDE | 1024 Kbyte |
| REGION 1/B SIDE | 1024 KByte |
| ... | ... |
| VERIFICATION EXPECTED VALUE (REGION 1/A SIDE) | 384 Byte |
| ... | ... |
| VERIFICATION EXPECTED VALUE (REGION 1/A SIDE & REGION 2/A SIDE) | 384 Byte |
| VERIFICATION EXPECTED VALUE (REGION 1/A SIDE & REGION 2/B SIDE) | 384 Byte |
| VERIFICATION EXPECTED VALUE (REGION 1/A SIDE & REGION 3/A SIDE) | 384 Byte |
| VERIFICATION EXPECTED VALUE (REGION 1/A SIDE & REGION 3/B SIDE) | 384 Byte |
| VERIFICATION EXPECTED VALUE (REGION 1/B SIDE & REGION 2/A SIDE) | 384 Byte |
| ... | ... |
| VERIFICATION EXPECTED VALUE (REGION 1/A SIDE & REGION 2/A SIDE & REGION 3/A SIDE) | 384 Byte |
| VERIFICATION EXPECTED VALUE (REGION 1/A SIDE & REGION 2/A SIDE & REGION 3/B SIDE) | 384 Byte |
| ... | ... |

501 = TARGET REGION, 502 = DATA SIZE

FIG. 8

| ... | REGION 1/B SIDE | ... | REGION 3/B SIDE | ... | VERIFICATION EXPECTED VALUE (REGION 1/B SIDE & REGION 3/A SIDE) | VERIFICATION EXPECTED VALUE (REGION 1/B SIDE & REGION 3/B SIDE) | ... |
|---|---|---|---|---|---|---|---|
| ... | 1 | ... | 1 | ... | 0 | 1 | ... |

INFORMATION PROCESSING DEVICE, PROGRAM UPDATE SYSTEM, AND PROGRAM UPDATE METHOD

INCORPORATION BY REFERENCE

This application claims priority to Japanese Patent Application No. 2020-28467 filed on Feb. 21, 2020, the contents of which are incorporated herein by reference.

TECHNICAL FIELD

The present invention relates to an information processing device and a control device, and particularly relates to a program update method.

BACKGROUND ART

As a recovery measure at the time of failure of program update, a program update technique for updating only a program in one storage region (standby region) has been studied for a device including two storage regions (start region and standby region) capable of holding the same type of program. In such a program update technique, if update of the program fails, the program is started in a start region that is not an update target. In particular, in order to restore the program to the latest version as much as possible, the standby region that becomes the update target of the program is preferably a standing-by region instead of the most recently started region. For example, PTL 1 (JP 10-63497 A) discloses a program update method in which when a program being executed is updated, the program having been updated is stored in a memory region different from the memory region in which the program is stored, and when the program is executed next time, the latest program from among the programs stored in a plurality of the memory regions is selected and executed.

According to the technique described in PTL 1 (JP 10-63497 A), a memory region different from a memory region in which a program being executed is stored can be specified as an update target.

SUMMARY OF INVENTION

Technical Problem

In a device having two memory regions, there is a case where the update programs do not completely match due to an influence such as a difference in address value for each memory region. In such a case, with the technique of PTL 1 (JP 10-63497 A), the program update worker cannot confirm the update target region in advance, and therefore, it is necessary to perform processing of confirming the update target region at the time of the program update and selecting an update program suitable for the update target region.

The present invention has been made in view of the above problem, and an object of the present invention is to reduce an operation load of a program update worker while reducing a usage amount of a temporary memory region required at the time of program update in a device capable of updating a program of a standby region even during execution of a control program.

Solution to Problem

A representative example of the invention disclosed in the present application is as follows. That is, an information processing device that executes a program includes: a storage unit that includes a plurality of regions for storing a rewritable program; a calculation unit that executes a program stored in the storage unit; a start region specification unit that specifies, from the plurality of regions, a start region in which the calculation unit is executing a program; a rule update unit that specifies a rewrite target region in which a program can be rewritten based on information on the specified start region; and a reception selection unit that selectively receives a rewrite program stored in the rewrite target region.

Advantageous Effects of Invention

According to the present invention, it is possible to reduce the usage amount of a temporary storage memory of the update program. Problems, configurations, and effects other than those described above will be made clear by the description of the following embodiments.

BRIEF DESCRIPTION OF DRAWINGS

FIG. 2 is a flowchart of processing in which the information processing device of the first embodiment of the present invention updates a program.

FIG. 3 is a view illustrating an example of a data structure of program update target flag information of the first embodiment of the present invention.

FIG. 4 is a view illustrating an example of a data structure of start region information of the first embodiment of the present invention.

FIG. 5 is a view illustrating an example of a data structure of package structure information of the first embodiment of the present invention.

FIG. 6 is a view illustrating an example of a data structure of a reception rule of the first embodiment of the present invention.

FIG. 7 is a view illustrating an example of a data structure of verification expected value combination information of the first embodiment of the present invention.

FIG. 8 is a view illustrating an example of a data structure of a reception rule based on verification expected value combination information that becomes an update target of the first embodiment of the present invention.

DESCRIPTION OF EMBODIMENTS

Embodiments of the present invention will be described below in detail with reference to the drawings.

First Embodiment

As an embodiment of the present invention, an example of a program update method targeting an information processing device (for example, an electric control unit that controls a vehicle) connected to an in-vehicle network will be described. However, the technical idea of the present invention is not limited to this example. For example, the present invention can be applied to an information processing device other than the vehicle control device as long as it has not an in-vehicle control device (ECU) but a two-face configuration of a start region and a standby region and updates a program.

Figure 1:
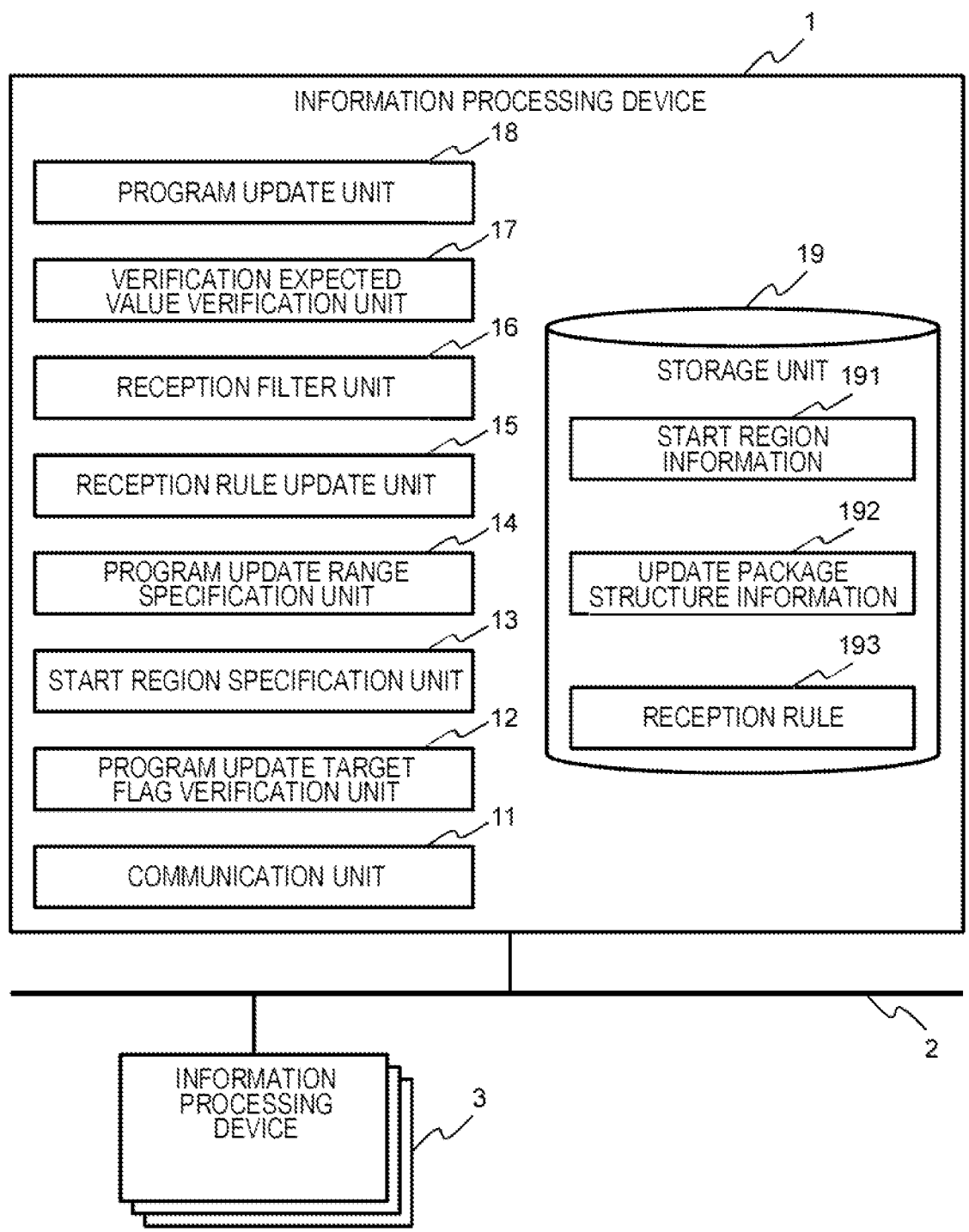
FIG. 1 is a view illustrating a configuration of an information processing device according to a first embodiment of the present invention.

FIG. 1 is a view illustrating the configuration of an information processing device 1 according to the first embodiment of the present invention. The information processing device 1 is connected to another information processing device 3 via a communication bus 2. However, the communication bus 2 may physically include a plurality of communication buses, and the standards of these communication buses may be the same or different. As a standard of these communication buses, CAN (registered trademark), LIN (registered trademark), FlexRay (registered trademark), Ethernet (registered trademark), or the like can be used. The information processing device 1 will be described below, and the information processing device 3 has the same configuration.

The information processing device 1 has a CPU (not illustrated), a ROM (not illustrated), and a RAM (not illustrated), and implements the following functions by the CPU developing, in the RAM, and executing a program stored in the ROM. That is, the information processing device 1 has, as its functions, a program update target flag verification unit 12, a start region specification unit 13, a program update range specification unit 14, a reception rule update unit 15, a reception filter unit 16, a verification expected value verification unit 17, and a program update unit 18. The information processing device 1 has a storage unit 19, which is a nonvolatile storage device, and a communication unit 11 that is a communication interface and performs calculation necessary for communication.

The information processing device 1 is physically divided into a plurality of computer devices, and the storage regions of the storage units 19 used in the devices are different. Note that the information processing device 1 may be logically divided into a plurality of computer devices, and the storage regions of the storage units 19 used in the devices may be different.

The communication unit 11 receives a message transmitted from the other information processing device 3 via the communication bus 2, and transmits a message to the other information processing device 3 via the communication bus 2. As described above, the communication bus 2 may physically include a plurality of communication buses. The information processing device 1 transmits and receives information necessary for program update using the communication unit 11. The program update target flag verification unit 12 specifies, among the plurality of information processing devices 3, a device that becomes an update target of a program based on the program update target flag indicating the device for which a program should be updated that is stored in the storage unit 19. Note that the device that becomes an update target of a program only needs to be a device that has a memory that can update the program, such as a Microcopmuter, a communication switch, and a hardware security module (HSM).

The start region specification unit 13 specifies, as a start region, a storage region in which a program to be executed is held and specifies, as a standby region, a storage region in which a program not to be executed is held among the storage region in which the program to be executed at the time of start is held and a storage region in which the program not to be executed is held in a storage region in which the same type of program can be divided into different regions and managed. The program update range specification unit 14 specifies a range of a package related to the standby region in an update program package. The reception rule update unit 15 updates a reception rule 193 defining the range to be received to a rule for selectively receiving the range of the package specified by the program update range specification unit 14.

The reception filter unit 16 selectively receives the update program package of the corresponding portion according to the reception rule 193. The verification expected value verification unit 17 verifies authenticity of the update program package using a verification expected value included in the received update program package. For example, in a case where a part of the update program package is missing or falsified, the verification expected value included in the update program package and the verification expected value calculated from the received update program data become different values, and it is indicated that the integrity of the update program package is lacking. In a case where the verification result by the verification expected value verification unit 17 is determined to be correct, the program update unit 18 updates the storage region that becomes the standby region with the verified update program.

The storage unit 19 stores start region information 191 indicating a region where a program executed at start is held, update package structure information 192 indicating the structure of an update program package received by the information processing device at the time of program update, and the reception rule 193 defining the range of data received by the reception filter unit 16 from the update program package. Note that in a case where one information processing device 1 is divided into a plurality of computer devices, the storage region of the storage unit 19 corresponding to respective computer device is different, but the start region information 191, the update package structure information 192, and the reception rule 193 are stored in one storage region even if not stored in the storage region corresponding to the respective computer device, and the computer device may collectively manage these pieces of information 191 to 193.

FIG. 2 is a flowchart of processing in which the information processing device 1 updates a program. The execution subject of each step described below is a CPU (not illustrated) of the information processing device 1.

In step 201, the information processing device 1 receives a communication message including a program update request by using the communication unit 11.

In step 202, the information processing device 1 receives program update target flag information by using the communication unit 11, and the program update target flag verification unit 12 specifies a device that becomes an update target based on the program update target flag.

FIG. 3 illustrates an example of the program update target flag information that is referred to by the program update target flag verification unit 12 in order to specify the device that becomes an update target in step 202. The program update target flag information includes storage region 301 corresponding to a device for which a program should be updated and an identifier 302 indicating corresponding or not corresponding. For example, since the value of a "region 1" of the region 301 is "1", it corresponds to the update target region of the program, and since the value of a "region 2" is "0", it does not correspond to the update target region of the program.

In step 203, the start region specification unit 13 specifies the start region and the standby region of each region using the start region information 191. Note that the processing in step 203 may be executed before step 201 or step 202.

FIG. 4 illustrates an example of the start region information 191, which is referred to by the start region specification unit 13 in order to specify whether each region of the storage unit 19 is a start region in step 203. The start region information 191 includes a storage region 401 corresponding to a device for which a program should be updated, and an identifier 402 indicating a start region and a standby region. For example, the start region of each storage region is defined as an "A side", the standby region is defined as a "B side", and if the value of the "region 1" of the region 401 is the "A side", it is indicated that the start region of the region 1 is the A side, and when the value of the "region 1" is the "B side", it is indicated that the start region of the region 1 is the B side. As illustrated, the information on the start region may be registered in the identifier 402, the information on the standby region may be registered in the identifier 402, or the information indicating whether each region is the start region or the standby region may be registered in the identifier 402. The fact that each region is the start region is preferably registered when the information processing device 1 is started, but the start region of each storage region may be registered at another timing, for example, it may be registered when a program update request is received.

In step 204, the program update range specification unit 14 specifies the program update range based on the update target region specified in step 202 and the start region specified in step 203. For example, in step 202, the program update range specification unit 14 specifies the "region 1" and a "region 3" as the program update target regions with reference to the program update target flag information, specifies the standby region of the region 1 in the program update target region as the "B side" and the standby region of the region 3 as the "B side" with reference to the start region information 191, and specifies a "region 1/B side" and a "region 3/B side" as the program update ranges.

In step 205, based on the program update range specified in step 204 described above, the reception rule update unit 15 updates the reception rule 193 so as to selectively receive data corresponding to the "region 1/B side" and the "region 3/B side" in the update program package.

FIG. 6 illustrates an example of the reception rule 193 updated by the reception rule update unit 15 in step 205. The reception rule 193 includes a reception target region 601, which is an identifier indicating a reception target region and a verification expected value in the update program package, and an identifier 602 indicating whether or not to perform reception. For example, when the value of a "region 1/A side" of the reception target region 601 is "1", the storage region "region 1/A side" is set as a reception target, and when the value of the "region 1/A side" is "0", the storage region "region 1/A side" is excluded from the reception target.

In step 206, the reception filter unit 16 receives data corresponding to the reception rule 193 updated in step 205. The received data is temporarily stored in a reception buffer of the communication unit 11, then stored in a temporary storage memory provided in a volatile RAM or a nonvolatile memory, and stored in a program storage region provided in the storage unit 19. In the present embodiment, the method of selectively receiving corresponding data can be implemented by not storing unnecessary received data in either the reception buffer or a temporary memory or by discarding the unnecessary received data. Specifically, other than the corresponding portion needs not be received and needs not be stored in the reception buffer, data other than the corresponding portion may be overwritten with data of the corresponding portion in the reception buffer, the received data may be stored in the reception buffer regardless of the corresponding portion and the corresponding portion may be selectively stored in a temporary storage memory provided in the RAM, the received data may be stored in the reception buffer regardless of the corresponding portion and the corresponding portion may be selectively stored in a temporary storage memory provided in the nonvolatile memory, and any method may be used as long as the corresponding portion is finally selectively stored.

In step 207, the verification expected value verification unit 17 verifies whether the update program data is correct data using the update program data received based on the reception rule 193 in step 206 and the verification expected value targeting the update program data. When the calculation processing result using the update program data matches the verification expected value (yes in step 208), the process proceeds to step 209, and when the calculation processing result does not match the verification expected value (no in step 208), the process proceeds to step 210. Here, the verification expected value used in the verification expected value verification processing of step 207 may be verification processing by a message authentication code (MAC) using a common key, may be RSA, ECDSA, or the like using a public key, or may be a hash or a checksum.

In step 209, based on a predetermined procedure, the program update unit 18 updates the program in the corresponding storage region with the received update program data.

In step 210, the information processing device 1 executes error processing according to a predetermined procedure in a case where the verification of the verification expected value has failed in step 208, and ends the present processing.

Through the above steps, it is possible to update the program of the information processing device 1 connected to the in-vehicle network.

In the present embodiment, an example in which the verification expected value in the update package structure information 192 is included for each target region has been described. As another method, FIG. 7 illustrates an example in which a verification expected value generated for each combination of target regions is included as the verification expected value in the update package structure information 192. The update package structure information 192 illustrated in FIG. 5 includes, in the target region 501, a verification expected value according to the number of combinations of the target regions and a data size 502 of it. The update program package indicated by the illustrated update package structure information 192 includes update program data stored in the storage region (A side of region 1 to B side of region n) and verification expected values of all combinations of the update program data. The update program package may include currentness information (for example, time stamp, counter value, or the like) of each of the update program data.

For example, in step 205, based on the program update range specified in step 204, the reception rule update unit 15 updates the reception rule 193 to a rule for selectively receiving a "verification expected value (region 1/B side & region 3/B side)", which is a verification expected value in which both the "region 1/B side" and the "region 3/B side" are put together in addition to the verification expected value of the "region 1/B side" and the verification expected value of the "region 3/B side" in the update program package, as illustrated in FIG. 8.

This makes it possible to reduce the data amount of the verification expected value to be received, and possible to reduce the number of times of verification expected value verification processing.

As described above, according to the first embodiment, when a program update request is received, the update program corresponding to the standing-by storage region can be limitedly received from the update program package including the program data of the entire region based on the information on the started storage region and the standing-by storage region. The information processing device 1 can determine by itself the region in which the program is updated. Due to this, when the storage region that becomes the update target region of the information processing device 1 is updated with the update program, the temporary storage memory amount used by the information processing device 1 can be reduced, and reduction of the operation load of the program update worker can be expected.

Second Embodiment

In the second embodiment, an example of a program update system is given in which the information processing device 1 connected to an in-vehicle network updates a program of another control device 4 connected to the in-vehicle network. Hereinafter, the second embodiment will be described focusing on the difference from the first embodiment, and the same functions and configurations as those of the first embodiment will be given the same reference numerals, and the description thereof will be omitted.

Figure 9:
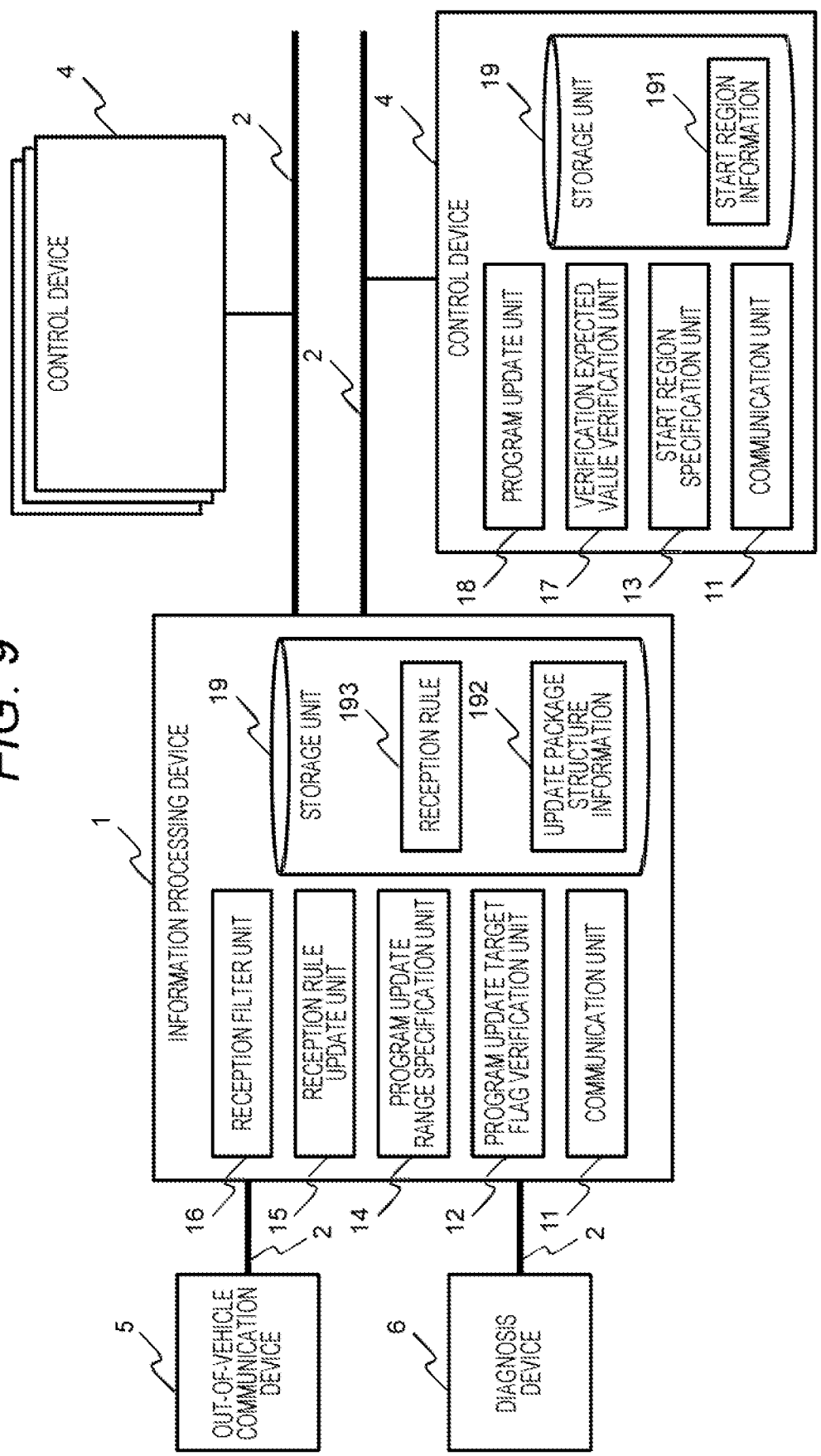
FIG. 9 is a view illustrating a configuration of a program update system of a second embodiment of the present invention.

FIG. 9 is a view illustrating the configuration of the program update system according to the second embodiment. In the program update system of the second embodiment, the information processing device 1 is connected to the control device 4, an out-of-vehicle communication device 5, and a diagnosis device 6 via the communication bus 2. However, the communication bus 2 may physically include a plurality of communication buses, and the standards of these communication buses may be the same or different. As a standard of these communication buses, CAN (registered trademark), LIN (registered trademark), FlexRay (registered trademark), Ethernet (registered trademark), or the like can be used. The control device 4 is a vehicle control device (ECU) having a function of controlling traveling of the vehicle or a vehicle control device (ECU) having a function of controlling an actuator other than traveling. The out-of-vehicle communication device 5 is a device that controls communication with an out-of-vehicle device via wireless communication such as 3G/LTE or Wi-Fi communication. The diagnosis device 6 is a device that is connected to the in-vehicle system via a wire and has a diagnosis function of confirming the states of the information processing device 1 and the control device 4 and a program update function.

The information processing device 1 includes the communication unit 11, the program update target flag verification unit 12, the program update range specification unit 14, the reception rule update unit 15, and the reception filter unit 16, among the components of the information processing device 1 illustrated in FIG. 1 of the first embodiment. The information processing device 1 has a CPU (not illustrated), a ROM (not illustrated), and a RAM (not illustrated), and implements the above-described functions by the CPU developing, in the RAM, and executing a program stored in the ROM. The information processing device 1 stores, in the storage unit 19, the update package structure information 192 and the reception rule 193 of the storage unit 19 of the information processing device 1 illustrated in FIG. 1 of the first embodiment. The control device 4 includes the communication unit 11, the start region specification unit 13, the verification expected value verification unit 17, and the program update unit 18, among the components of the information processing device 1 illustrated in FIG. 1 of the first embodiment. The control device 4 has a CPU (not illustrated), a ROM (not illustrated), and a RAM (not illustrated), and implements the above-described functions by the CPU developing, in the RAM, and executing a program stored in the ROM. The control device 4 stores, in the storage unit 19, the start region information 191 of the storage unit 19 of the information processing device 1 illustrated in FIG. 1 of the first embodiment.

Figure 10:
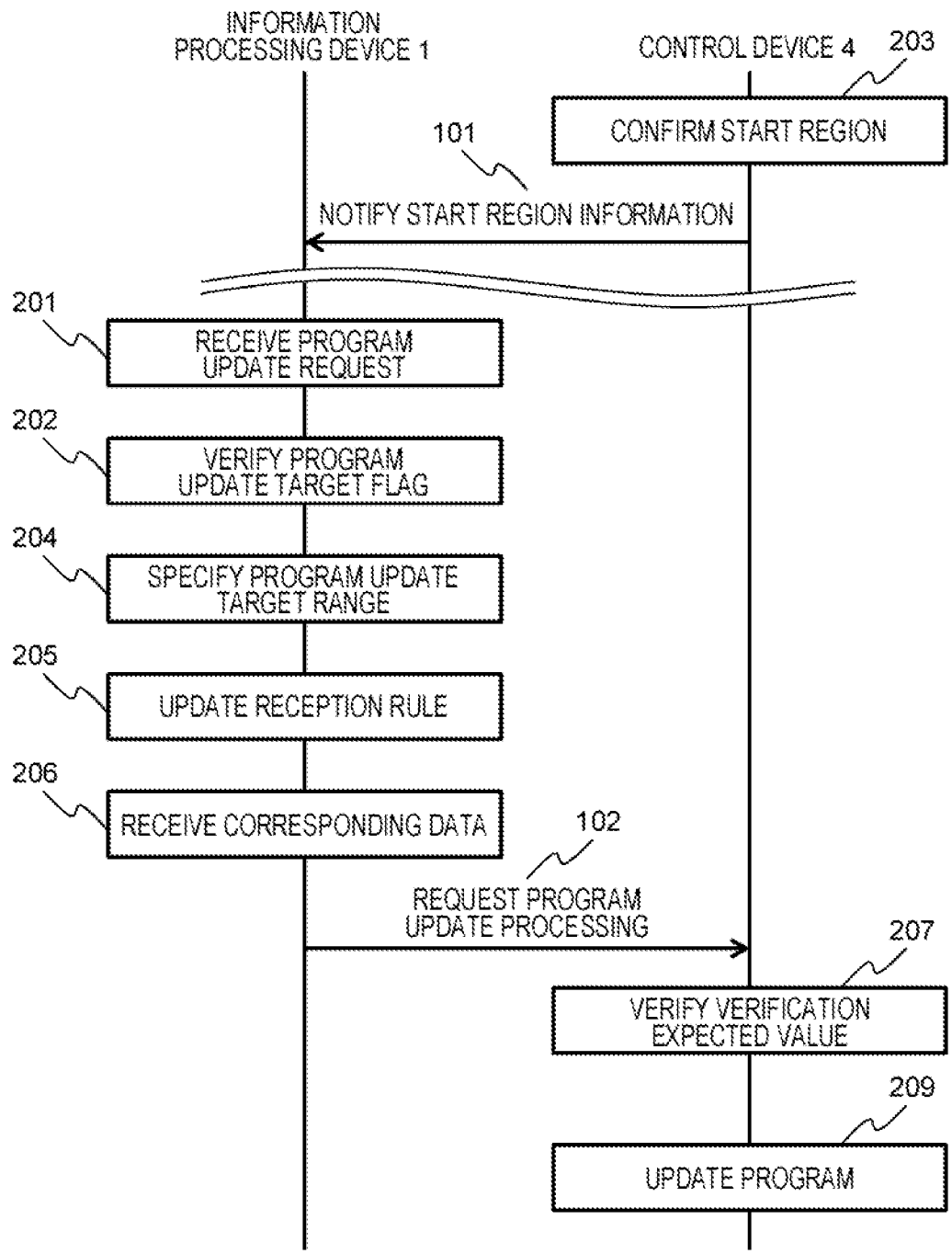
FIG. 10 is an update processing sequence diagram in the program update system of the second embodiment of the present invention.

FIG. 10 is a sequence diagram of processing in which the information processing device 1 updates a program of the control device 4 in the program update system. Note that in FIG. 10, the same processing as those described in FIG. 2 of the first embodiment will be given the same reference numerals, and redundant description will be omitted.

In step 203, as in the first embodiment, the start region specification unit 13 specifies the start region and the standby region of each region using the start region information 191. Note that the processing in step 203 may be executed at any timing such as at the time of start of the control device 4 or in response to a request from the information processing device 1.

In step 101, the start region specification unit 13 notifies, via the communication unit 11, the information processing device 1 of the start region of the control device 4 specified in step 203.

In step 201, the communication unit 11 of the information processing device 1 receives a program update request. There are a case where the program update request is received from the out-of-vehicle communication device 5 and a case where it is determined that the program needs to be updated based on the diagnosis result by the diagnosis device 6 and the program update request is received from the diagnosis device 6.

Steps 202 to 206 are the same processing as those in the first embodiment.

In step 102, the information processing device 1 transmits, to the control device 4, the corresponding data received via the communication unit 11 in step 206. Note that the processing in step 102 may be transmitted by the information processing device 1 at any timing, may be transmitted after the control device 4 confirms to become in a specific state (for example, a state in which the program can be updated), or may be transmitted when predetermined communication from the control device 4 or another device is received.

Steps 207 to 210 are the same processing as those in the first embodiment. Note that the verification expected value verification processing in step 207 may be executed by the information processing device 1.

Through the above steps, the information processing device 1 connected to the in-vehicle network can update the program of the control device 4.

As described above, according to the second embodiment, the control device 4 confirms the start region at a predetermined timing, and the information processing device 1 receives the start region information 191 from the control device 4, and when receiving the program update request, the information processing device 1 can selectively receive the update program corresponding to the standing-by storage region from the update program package including the program data of the entire region based on the information on the started storage region and the standing-by storage region. Due to this, when the storage region that becomes the update target region of the control device 4 is updated with the update program, the temporary storage memory amount used by the information processing device 1 can be reduced, and reduction of the operation load of the program update worker can be expected.

As described above, the information processing device 1 of the first embodiment of the present invention includes: the storage unit 19 including a plurality of storage regions that store a rewritable program; the calculation unit (CPU) that executes the program stored in the storage unit 19; the start region specification unit 13 that specifies, from the plurality of storage regions, a start region in which the calculation unit is executing a program; the reception rule update unit 15 that specifies a rewrite target region in which the program can be rewritten based on information on the specified start region; and the reception selection unit (reception filter unit 16) that selectively receives the rewrite program stored in the rewrite target region, and therefore, the information processing device 1, which is a program update target, can acquire an update program necessary autonomously from an update program package including all update programs, can reduce the usage amount of the temporary storage memory, and can reduce an operation load at the time of program update. On the server side that transmits the update program package, it is not necessary to grasp individual states of the information processing device 1 (for example, start surface confirmation processing needs not be executed), it is only required to collectively transmit all the update programs, and it is possible to reduce the complexity and load of the processing on the server side. Furthermore, a conventional repro-based diagnostic needs not be modified.

Since the program update unit 18 that stores a received rewrite program into the rewrite target region is included, the program can be updated while reducing the usage amount of the temporary storage memory.

The rewrite program is distributed as an update program package including program data stored in each region of the storage unit 19 and the verification expected values of the program data, and the information processing device 1 includes the verification expected value verification unit 17 that verifies the program data using the verification expected value included in the update program package. Therefore, it is possible to detect alteration of data generated on the communication path and improve resistance to an unauthorized program.

The update program package includes a plurality of verification expected values corresponding to a plurality of combinations of program data included in the update program package, and the verification expected value verification unit 17 specifies, with reference to the information on the start region and the information on the region in which the program should be rewritten, the verification expected value of the received rewrite program from the plurality of verification expected values included in the package. Therefore, it is possible to provide a verification expected value necessary depending on the state on the information processing device 1 side.

Since the reception rule update unit 15 determines the rewrite program to be received with reference to the information on the start region and the information on the region in which the program should be rewritten, it is possible to accurately determine the program that should be updated.

The program update system of the second embodiment of the present invention includes: the control device 4 that executes a program; and the information processing device 1 that controls rewrite of the program of the control device 4, the control device 4 includes the storage unit 19 including a plurality of storage regions that store a rewritable program and the calculation unit (CPU) that executes the program stored in the storage unit 19, and the information processing device 1 includes the reception rule update unit 15 that specifies a rewrite target region in which the program can be rewritten based on information on the start region in which the calculation unit (CPU) is executing the program in the control device 4, and the reception selection unit (reception filter unit 16) that selectively receives the rewrite program stored in the rewrite target region, and therefore, the information processing device 1 can acquire an update program necessary for the control device 4 from an update program package including all update programs, can reduce the usage amount of the temporary storage memory, and can reduce an operation load at the time of program update.

Note that the present invention is not limited to the above-described embodiments, but includes various modifications and equivalent configurations within the scope of the appended claims. For example, the above-described embodiments have been described in detail for the purpose of explaining the present invention in an easy-to-understand manner, and the present invention is not necessarily limited to those including all the configurations described above. The configuration of a certain embodiment can be replaced partly by the configuration of another embodiment. The configuration of another embodiment may be added to the configuration of a certain embodiment. Another configuration may be added to, deleted from, or substituted for a part of the configuration of each embodiment.

A part or all of the above-described configurations, functions, processing units, processing means, and the like may be implemented by hardware by being designed as an integrated circuit or the like, or may be implemented by software by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, a DVD, and a BD.

Control lines and information lines that are considered necessary for the description are illustrated, and not necessarily all the control lines and information lines essential for implementation are illustrated. In reality, almost all the configurations may be considered mutually connected.

The invention claimed is:

1. An information processing device that executes a program, the information processing device comprising:
   a storage unit that includes a plurality of regions for storing a rewritable program;
   a calculation unit that executes a program stored in the storage unit;
   a start region specification unit that specifies, from the plurality of regions, a start region in which the calculation unit is executing a program;
   a program update range specification procedure that specifies an update range of a package based on a rewrite target region and the start region by specifying regions of the plurality of regions including a first region and a second region as the rewrite target region, specifying the standby region of the first region in the rewrite target region ("region 1/B side") and the standby region of the second region in the rewrite target region ("region 2/B side"), and specifying the region 1/B side and region 2/B side as the update range;

a rule update procedure that updates a reception rule defining the update range of the package related to the standby region for selectively receiving the update range of the package, the package including all update programs of the plurality of regions and verification expected values corresponding to a plurality of combinations of program data for verifying authenticity of the package, the reception rule including a first identifier indicating the rewrite target region and the verification expected values in the package and a second identifier indicating whether or not to perform reception of the update range to selectively receive a first verification expected value of the region 1/B side, a second verification expected value of the region 2/B side, and a third verification expected value of a combination of the region 1/B side and region 2/B side;

wherein the rule update procedure specifies the rewrite target region in which a program is rewritten for an update as a rewrite program based on information on the specified start region, wherein the rule update procedure specifies rewrite programs associated with both: i) the start region, wherein the rewrite program is distributed as the update range of the package, and ii) a standby region; and a reception selection unit that, based on the updated reception rule, selectively receives the rewrite program associated with only the standby region, from the package.

2. The information processing device according to claim 1, comprising a communication unit that temporarily stores received data in a reception buffer, wherein in the communication unit, the reception selection procedure selectively receives the rewrite program by not storing data other than the rewrite program into the reception buffer, by overwriting, with subsequent data, data other than the rewrite program stored in the reception buffer, or by not transferring, to the reception selection procedure, data other than the rewrite program stored in the reception buffer.

3. The information processing device according to claim 1, comprising an update procedure that stores the received rewrite program into the rewrite target region.

4. The information processing device according to claim 1, wherein
the information processing device comprises a verification unit that verifies the program data using a verification expected value included in the package.

5. The information processing device according to claim 4, wherein
the verification unit specifies, with reference to information on the start region and information on a region in which the program should be rewritten, a verification expected value of the received rewrite program, from a plurality of verification expected values included in the package.

6. A program update system comprising:
a hardware control device that executes a program; and
an information processing device that controls rewrite of a program of the control device,
wherein the control device includes a storage unit that includes a plurality of regions for storing a rewritable program, and a calculation unit that executes a first program stored in the storage unit, and
the information processing device includes a start region specification procedure that specifies, from the plurality of regions, a start region in which the calculation unit is executing the first program in the storage unit and a standby region in which a second program not to be executed is stored in the storage unit;

a program update range specification procedure that specifies an update range of a package based on a rewrite target region and the start region by specifying regions of the plurality of regions including a first region and a second region as the rewrite target region, specifying the standby region of the first region in the rewrite target region ("region 1/B side") and the standby region of the second region in the rewrite target region ("region 2/B side"), and specifying the region 1/B side and region 2/B side as the update range;

a rule update procedure that updates a reception rule defining the update range of the package related to the standby region for selectively receiving the update range of the package, the package including all update programs of the plurality of regions and verification expected values corresponding to a plurality of combinations of program data for verifying authenticity of the package, the reception rule including a first identifier indicating the rewrite target region and the verification expected values in the package and a second identifier indicating whether or not to perform reception of the update range to selectively receive a first verification expected value of the region 1/B side, a second verification expected value of the region 2/B side, and a third verification expected value of a combination of the region 1/B side and region 2/B side;

wherein the rule update procedure specifies the rewrite target region in which the second program is rewritten for an update as a rewrite program based on information on the specified start region in which the first program is being executed by the calculation unit in the control device, wherein the rule update procedure specifies rewrite programs associated with both: i) the start region, and ii) the standby region, wherein the rewrite program is distributed as the update range of the package; and a reception selection procedure that, based on the updated reception rule, selectively receives the rewrite program associated with only the standby region, among the rewrite programs, from the package.

7. A program update method for updating a program of an information processing device that executes a program,
the information processing device including
a storage unit that includes a plurality of regions for storing a rewritable program, and
a calculation unit that executes a program stored in the storage unit, the program update method comprising:
specifying, by a start region specification procedure of the information processing device, from the plurality of regions, a start region in which the calculation unit is executing a program;
specifying, by a program update range specification procedure, an update range of a package based on a rewrite target region and the start region by specifying regions of the plurality of regions including a first region and a second region as the rewrite target region, specifying the standby region of the first region in the rewrite target region ("region 1/B side") and the standby region of the second region in the rewrite target region ("region 2/B side"), and specifying the region 1/B side and region 2/B side as the update range;
updating, by a rule update procedure of the information processing device, a reception rule defining a update range of a package related to the standby region for selectively receiving the update range of the package, the package including all update programs of the plurality of regions and verification expected values corresponding to a plurality of combinations of program data for verifying authenticity of the package, the reception rule including a first identifier indicating the rewrite target region and the verification expected values in the package and a second identifier indicating whether or not to perform reception of the update range to selectively receive a first verification expected value of the region 1/B side, a second verification expected value of the region 2/B side, and a third verification expected value of a combination of the region 1/B side and region 2/B side;

wherein the rule update procedure specifies the rewrite target region in which a program is rewritten for an update as a rewrite program based on information on the specified start region, wherein the rule update unit specifies rewrite programs associated with both: i) the start region, and ii) a standby region, wherein the rewrite program is distributed as the update range of the package; and based on the updated reception rule, selectively receiving, by a reception selection procedure of the information processing device, the rewrite program associated with only the standby region, from the package.

* * * * *